C. Locher.
Folding Life Boat.
No. 395. Reissued Sept. 16, 1856.
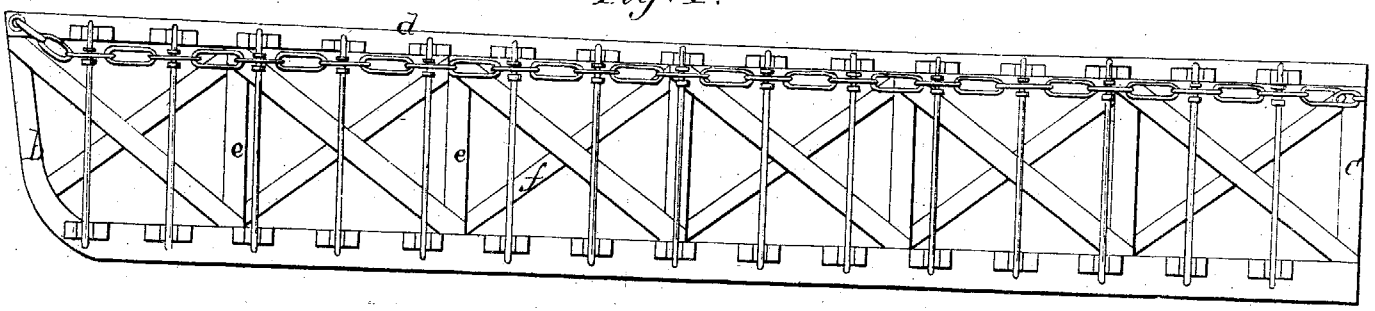
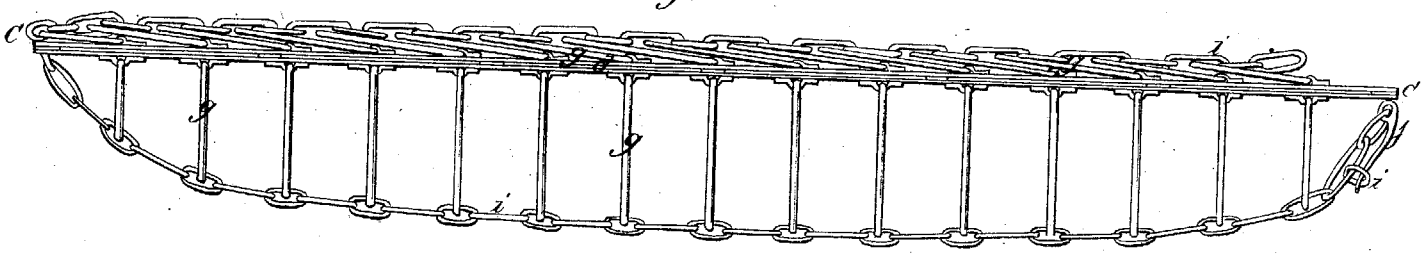
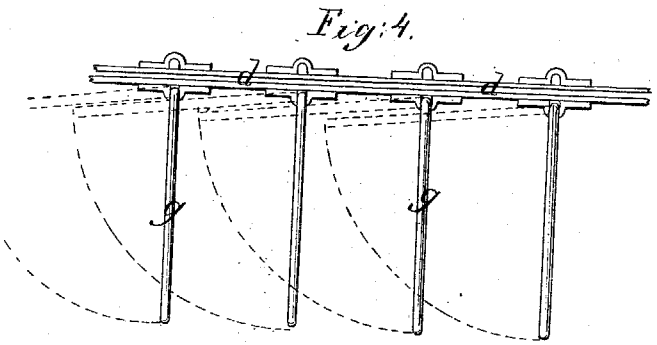
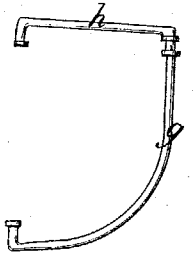
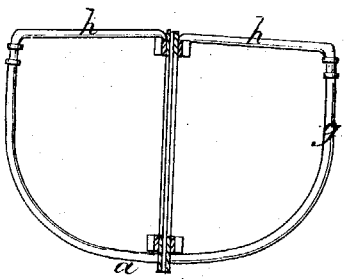
Witnesses.
Chas Neffle
Adrian Holley
Inventor.
C. Locher
N. PETERS, PHOTO-LITHOGRAPHER, WASHINGTON, D. C.

UNITED STATES PATENT OFFICE.

C. LOCHER, OF NEW YORK, N. Y.

IMPROVEMENT IN FOLDING LIFE-BOATS.

Specification forming part of Letters Patent No. 12,184, dated January 2, 1855; Reissue No. 395, dated September 16, 1856.

*To all whom it may concern:*

Be it known that I, C. LOCHER, of the city, county, and State of New York, have invented a new and useful Improvement in Folding Life-Boats; and I do hereby declare that the following is a full, clear, and exact description of the same, reference being had to the accompanying drawings, forming part of this specification, in which—

Figure 1 is a side view of the frame-work of a boat constructed according to my invention. Fig. 2 is a plan of the same, partly folded. Fig. 3 is a transverse section of the same. Fig. 4 is a top view of a portion of the frame, illustrating the movements of the ribs in folding and unfolding. Fig. 5 is a view of one of the ribs detached from the frame.

Similar letters of reference indicate corresponding parts in the several figures.

My invention relates to the construction of a folding frame to support and sustain a covering of sheet india-rubber, india-rubber cloth, or other water-proof material to form a boat. This frame is composed, in part, of a central frame and movable ribs hinged or pivoted thereto; but the above frame and ribs, having been used before, do not of themselves constitute my invention, which consists of the ribs and central frame, with a chain or chains or their mechanical equivalents, by which all the ribs are unfolded or spread at once, and when extended are well stayed in a proper position to keep the boat extended and in proper condition for service.

To enable those skilled in the art to make and use my invention, I will proceed to describe its construction and operation.

The central frame may be constructed of timber or metal; but I propose to construct it of strips of metal plate, and have shown it so constructed. It is composed of two strips, *a a*, which form the keel, a strip, *b*, forming the stem, another, *c*, forming the stern-post, two others, *d d*, uniting and bracing the upper part of the stem *b* and the stern-post *c*, upright pieces *e e*, uniting the keel and the upper strips, *d d*, and diagonal braces *f f*, uniting the upright pieces *e e*, all being riveted together in the securest manner. The ribs *g g* may be of wood or metal; but I have shown them composed of light iron rod. They are pivoted or hinged at the bottom to the keel, and at the top to the brace *d d*, the top part being extended, as shown at *h* in Figs. 3 and 5, for the purpose of carrying the upper pivot, and at the same time forming a stay. The ribs, when the boat is folded, lie over one another, nearly close to the central frame, as shown in the upper half of Fig. 2; but when the boat is extended they stand at nearly right angles to the central frame. The ribs may fold in either direction, but preferably toward the stem, as represented.

*i i* represent two chains or their mechanical equivalents, attached one to each side of the stem *b*, and connected to the upper parts of all the ribs on their respective sides. The ends *j j* of these chains are provided with suitable means of connection. When the boat is folded up, the chains are disconnected. The boat is extended by pulling of the ends of the chains, and thereby spreading all the ribs at once, after which the ends of the chains are passed round the stern-post and secured together, and the ribs thereby firmly held in place. The chains, when the boat is extended, occupy the place of the gunwale of an ordinary boat. If the ribs should be arranged to fold toward the bow, the chains must be secured to the stern-post instead of the stem, as described; but it is preferable to have the ribs fold toward the stem, as then, when the boat is in motion, the pressure of the water tends to keep them extended.

I do not claim hinging or pivoting the ribs to a keel or to a central frame; but

What I claim as my invention, and desire to secure by Letters Patent, is—

The chain or chains, or their equivalents, as connected and arranged in relation to the stem and stern-posts, rib, and central frame, and operated as herein set forth.

C. LOCHER.

Witnesses:

CHS. WEHLE,

ADRIAN ISELIN.